United States Patent
Grundhöfer et al.

(10) Patent No.: US 9,940,753 B1
(45) Date of Patent: Apr. 10, 2018

(54) REAL TIME SURFACE AUGMENTATION USING PROJECTED LIGHT

(71) Applicant: Disney Enterprises, Inc., Burbank, CA (US)

(72) Inventors: Anselm Grundhöfer, Uster (CH); Amit Bermano, Princeton, NJ (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/290,226

(22) Filed: Oct. 11, 2016

(51) Int. Cl.
| | |
|---|---|
| G09G 5/00 | (2006.01) |
| G06T 19/00 | (2011.01) |
| G06T 7/00 | (2017.01) |
| G06T 7/20 | (2017.01) |
| G06T 7/40 | (2017.01) |
| H04N 5/33 | (2006.01) |
| G06K 9/00 | (2006.01) |

(52) U.S. Cl.
CPC ........ G06T 19/006 (2013.01); G06K 9/00302 (2013.01); G06T 7/004 (2013.01); G06T 7/20 (2013.01); G06T 7/40 (2013.01); H04N 5/33 (2013.01); *G06T 2207/30201* (2013.01)

(58) Field of Classification Search
CPC .................................................. G06T 2210/44
USPC ................................ 345/646, 647, 633, 634
See application file for complete search history.

(56) References Cited

U.S. PATENT DOCUMENTS

| | | | | |
|---|---|---|---|---|
| 2002/0041285 | A1* | 4/2002 | Hunter | G06T 3/0093 345/474 |
| 2010/0309226 | A1* | 12/2010 | Quack | G06F 17/30244 345/634 |
| 2013/0173235 | A1* | 7/2013 | Freezer | G06F 19/3437 703/2 |
| 2013/0287294 | A1* | 10/2013 | Ye | G06T 15/04 382/154 |
| 2015/0356704 | A1* | 12/2015 | Lipman | G06T 3/0093 703/1 |

OTHER PUBLICATIONS

Fang et al. ("Volume Morphing Methods for Landmark Based 3D Image Deformation", Proceedings of SPIE—The international Society of Optical Engineering, 1996).*

* cited by examiner

*Primary Examiner* — Ryan R Yang
(74) *Attorney, Agent, or Firm* — Dorsey & Whitney LLP (57) ABSTRACT

A method of augmenting a target object with projected light is disclosed. The method includes determining a blend of component attributes to define visual characteristics of the target object, modifying an input image based, at least in part, on an image of the target object, wherein the modified input image defines an augmented visual characteristic of the target object, determining a present location of one or more landmarks on the target object based, at least in part, on the image of the target object, predicting a future location of the one or more landmarks, deforming a model of the target object based on the future location of the one or more landmarks, generating an augmentation image based on the deformed model and the modified input image, and transmitting for projection the augmentation image.

22 Claims, 6 Drawing Sheets

FIG. 6

REAL TIME SURFACE AUGMENTATION USING PROJECTED LIGHT

BACKGROUND

Manipulating the appearance of surfaces with high frequency motion or rapid deformation is desirable in many fields such as the visual and performing arts. For example, manipulating the appearance of human faces is a common practice in many cultures and industries. Traditionally, appearances are altered through the application of paint, die, makeup, prosthetics, etc. Such alterations are static, and manual labor is typically required to apply and change the alteration. Projected light has also been used to alter the appearance of static, stationary surfaces, such as movie screens. However, realistic real-time projection onto moving or changing surfaces has proved difficult. Slow processing speeds and inefficient methods of calculation and projection have historically prevented realistic real-time projection onto moving or changing surfaces. To allow performers to move at the their natural pace, more efficient methods of computing projectable images to augment a moving surface in real time without perceptible lag are needed.

SUMMARY

An example of the present disclosure relates to a method of augmenting a target object with projected light. The method includes determining, by a processor, a blend of component attributes to define visual characteristics of the target object, modifying, by the processor, an input image based, at least in part, on an image of the target object, wherein the modified input image defines an augmented visual characteristic of the target object, determining, by the processor, a present location of one or more landmarks on the target object based, at least in part, on the image of the target object, predicting a future location of the one or more landmarks, deforming, by the processor, a model of the target object based on the future location of the one or more landmarks, generating, by the processor, an augmentation image based on the deformed model and the modified input image, and transmitting for projection, by the processor, the augmentation image.

Another example of the present disclosure relates to a visual augmentation system. One embodiment of the system includes a camera, a projector, and a processor coupled to the camera and the projector. The processor is configured to receive, from the camera, an image of a target object having a visual appearance, determine a weighted blend of component attributes to approximate the appearance target object based on the received image, modify a texture based on the weighted blend of component attributes, detect a location of at least one landmark in the image of the target object, predict a future location of the at least one landmark, generate a deformed model of the target object based, at least in part, on the future location of the at least one landmark, apply the texture to the deformed model to generate a projectable image, and transmit for projection by the projector, the projectable image.

Yet another example of the present disclosure relates to a method of augmenting a face with projected light. One embodiment of the method includes receiving, by a processor, an image of a face, wherein the image is of infrared light reflected from the face, analyzing the image of the face, by the processor, to independently detect current locations of landmarks and a facial expression, altering, by the processor, an appearance of an input image based, on the facial expression, predicting, by the processor, future locations of the landmarks based on the current locations of the landmarks, deforming, by the processor, a digital representation of the face based on the locations of the landmarks, applying, by the processor, the altered input image to the deformed digital representation of the face to generate an augmentation image, and transmitting, by the processor, the augmentation image for display.

DETAILED DESCRIPTION

The present application is directed to methods and systems for augmenting moving projection surfaces, generally referred to as targets objects (such as human faces), in real-time, using projector based illumination. The disclosed systems and methods predict future locations of the moving target object based on a live input of images from a camera ("orientation images"). The systems and methods also modify predefined input images reflecting the desired appearance of the target object based on the live input of images. The systems and methods then combine the modified textures with the predicted locations of the target object to generate projectable images ("augmentation images") that can be projected by a projector onto the target object to augment its appearance in real time.

The system includes a camera and a projector, where the camera captures orientation images of the performer in real time, and the projector projects the augmentation images onto the performer. The orientation images allow the system to detect the locations of landmarks, such as specific points or features (e.g., facial features, eyes, eyebrows, and mouth), on the target object, as well as the appearance (e.g., variations color, shading, saturation, and chroma) of the target object. The system then uses the landmarks to predict the future position and at the next projection time. The system uses the determined appearance to modify a predefined input image to match the appearance of the target object in the orientation image. In addition to the prediction, the system may also use filtering techniques to quickly match landmark locations with a possible expression to further reduce the computation time for the system.

Using the predicted position and modified input image of the object, the system generates a desired image or augmentation image to be projected onto the object (e.g., a modified texture, picture, color, etc.). The system may include a model of the object that is deformed based on the predicted appearance of the object. The deformed model combined with the modified input image to generate the augmentation image such that the final projected image will match (or substantially match) the position and orientation of the target object at projection time.

Real-time augmentation requires high quality projectable images that account for real time movement of the target object. However, to generate believable augmentation, systems also require extremely low computation time to avoid perceptible lag in the augmentation as compared to the movement of the target. On average, human observers can perceive lag in displayed content where the latency is as low as 6 ms, keeping latency levels low limits the potential complexity of the algorithms used.

The disclosed system satisfies both the resolution and computational requirements for real-time augmentation. In particular, the system uses pre-rendered two-dimensional (2D) input images, or textures, of the desired appearance (e.g., color, pattern, brightness, shading, etc.) of the target object to help avoid three-dimensional (3D) processing during run-time. Further, by aligning a camera and a projector (either physically or virtually) 3D processing can be eliminated because pixels of the camera map to corresponding pixels of the projector. For example, with the disclosed system, a 2D base mesh can be quickly deformed to match the detected facial landmark positions and this mesh can then be used to generate the augmentation image corresponding to the position of the object.

Benefits of the disclosed systems and methods include, simulating different lighting conditions and expression specific effects, such as facial wrinkles, on a moving object in real-time without perceived lag. Additionally, real-time augmentation with projected light may allow the projected image to evolve over time, such as to simulate aging without the necessity of physical labor and makeup.

Figure 1:
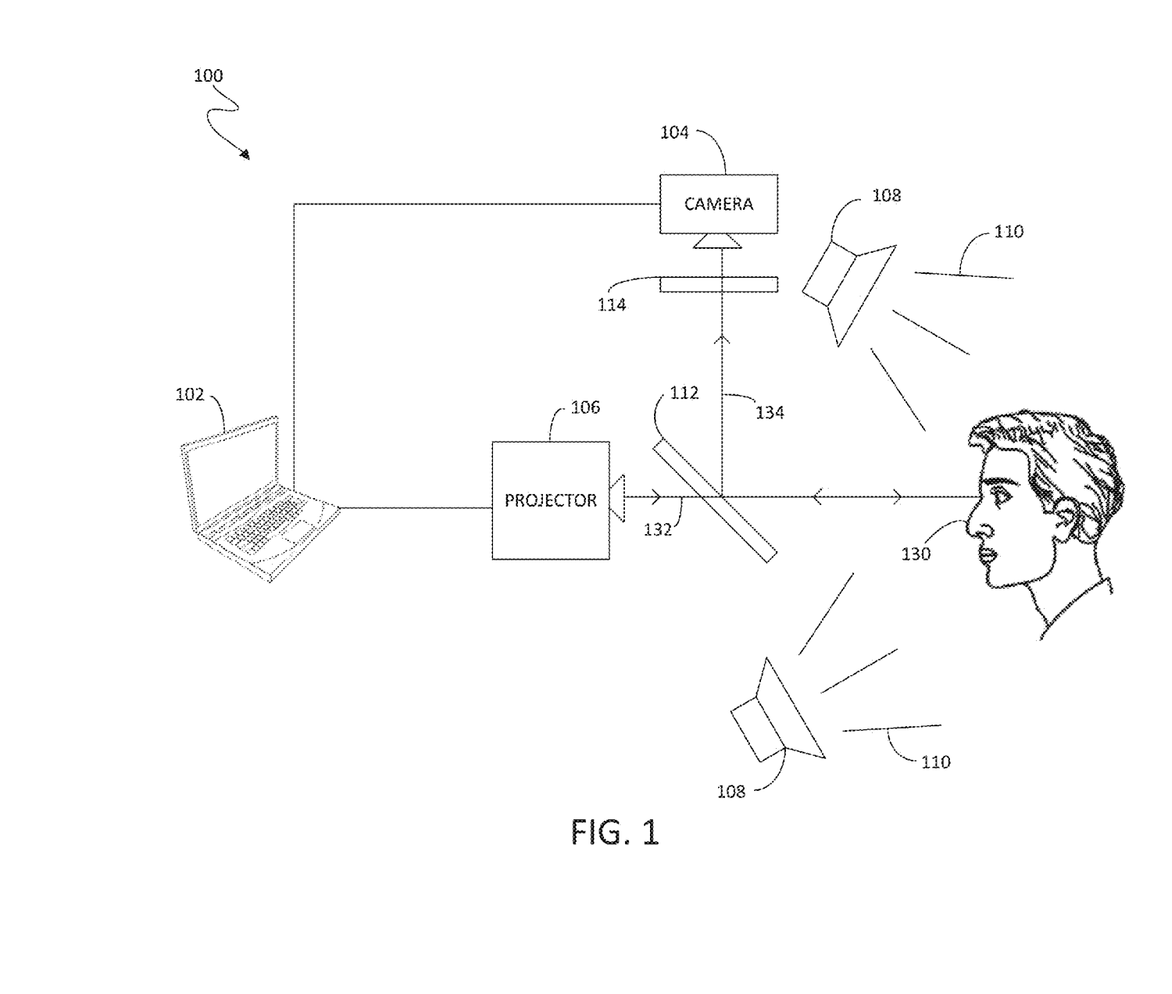
FIG. 1 is a functional block diagram of a real-time augmentation system.

FIG. 1 is a functional block diagram of a facial augmentation system, generally designated 100. The facial augmentation system 100 includes a computer 102, a camera 104, a projector 106, a plurality of illumination sources 108, an optical alignment component 112, and a filter 114.

The camera 104 is an image capture device capable of recording real-time orientation images (still or moving) of a target 130. The camera 104 can be calibrated to detect a particular wavelength or range of wavelengths of electromagnetic (EM) radiation emitted by the illumination sources 108 and reflected from the target 130. In one example, the camera 104 captures images of the target 130 at a wavelength or range of wavelengths imperceptible to a human, such as images in the infrared (IR) spectrum (e.g., 700-1000). In another example, the camera 104 captures images in the visual spectrum. The wavelength range and other settings of the camera 104 are variable based on the particular implementation and may depend on the types of illumination sources, the target, environmental factors, and the type of projector used. The camera 104 may be high resolution (e.g., 2320×720 pixels) and high speed (e.g., 1300 Hz framerate). The camera may include a processor for recording metadata associated with each captured image. For example, the processor may record a timestamp indicating when each orientation image was captured.

The illumination sources 108 are lamps, light bulbs, or any other source that emits EM radiation 110 having a wavelength or wavelengths detectable by the camera 104. For example, if the camera 104 is an infrared (IR) camera, the illumination sources 108 are IR emitters that emit EM radiation 110 at wavelengths between 700 nm and 900 nm. In another example, if the camera 104 captures images in the visible spectrum, the illumination sources 108 are EM radiation emitters in the visible spectrum. For example, the illumination sources 108 may emit EM radiation of a specific color, range of colors, or white light. Any number of illumination sources 108 may be implemented in various embodiments. The illumination sources 108 may emit EM radiation 110 at a predetermined wavelength(s) in a flood light-style pattern, e.g., to illuminate large areas including the target 130. Alternatively, the illumination sources 108 can be configured to project a spotlight, or a spatially targeted beam, of EM radiation 110 on the target 130.

The projector 106 projects static or moving images. In one example, the projector 106 is a high frame-rate projector. The projector may include a light source, a mirror assembly, an imaging device, one or more lenses, one or more processors, an I/O interface, one or more memory components, and a power source. The mirror assembly may include one or more mirrors to direct light from the light source to the imaging device. The imaging device may be, for example, a digital micro-mirror device. The imaging device may form the light from the light source into an image and direct the image toward the one or more lenses, which focus the image on the target 130. The imaging device may be controlled by the one or more processors. The processors may manipulate the imaging device to form the image based on the input image data. The power source may be a battery, power cord, or other element configured to provide power to the components of the projector 106. In one example, the projector 106 is configured to display content with 2K resolution at an RGB depth of 8 bits and a refresh rate of at least 480 Hz. The type, speed, and resolution of the projector may be varied based on the desired augmentation and application. In some embodiments, the system can include two or more projectors 106 positioned at various locations/angles with respect to the target 130.

In one example, the projector 106 can be optically and/or computationally registered with the camera 104 such that pixels of the projector 106 correspond to one or more pixels of the camera 104. By registering the projector 106 with the camera 104, a known correlation between the pixels of the projector 106 and the pixels of the camera 104 can be generated allowing pixel values detected from the captured image to be efficiently translated to corresponding pixel values of an augmentation image to be projected by the projector 106. Registration may include, for example, optically aligning the camera 104 and the projector 106 along a common optical path using, for example, the optical alignment component 112. In other embodiments, pixel correlations between the camera 104 and the projector 106 may be determined computationally by the computer 102.

The optical alignment component 112 aligns the camera 104 and the projector along a common optical axis. By aligning the camera 104 and the projector 106 along a common optical alignment, a common field of view is generated for the camera 104 and the projector 106, simplifying pixel mapping between the camera 104 and the projector 106. In one example, the optical alignment component 112 divides incident light, allowing a first portion of light to pass through the optical alignment component 112, and reflecting a second portion of the incident light. In one example, the optical alignment component 112 is a hot mirror, such as a dielectric mirror or a dichroic mirror that reflects light of particular wavelength(s) and allows other light to pass through. In another example, the optical alignment component 112 is a beam splitter. In yet another embodiment, the optical alignment component 112 is a partial reflecting mirror.

In one example, the optical alignment component 112 reflects a primarily IR portion of light received from the target 130 toward the camera 104 and allows primarily visible light from the projector 106 to pass through toward the target 130. In such an example, the optical alignment component 112 is positioned in front of and aligned with an optical axis 132 of the projector 106. In this example, the optical alignment component 112 is oriented at an angle relative to the optical axis 132 of light projected from the projector 106 such that reflected EM radiation 110 is directed toward the camera 104 along a beam path 134.

The filter 114 is an optical filter that selectively transmits EM radiation of a desired wavelength and blocks EM radiation of other wavelengths. For example, the filter 114 can be an IR pass filter, which allows IR EM radiation to pass through and blocks other wavelengths (e.g., visible light). In some embodiments, the filter 114 may be omitted. For example in embodiments where the camera 104 is highly selective to a particular wavelength, there may not be a need to filter out other wavelengths.

Figure 2:
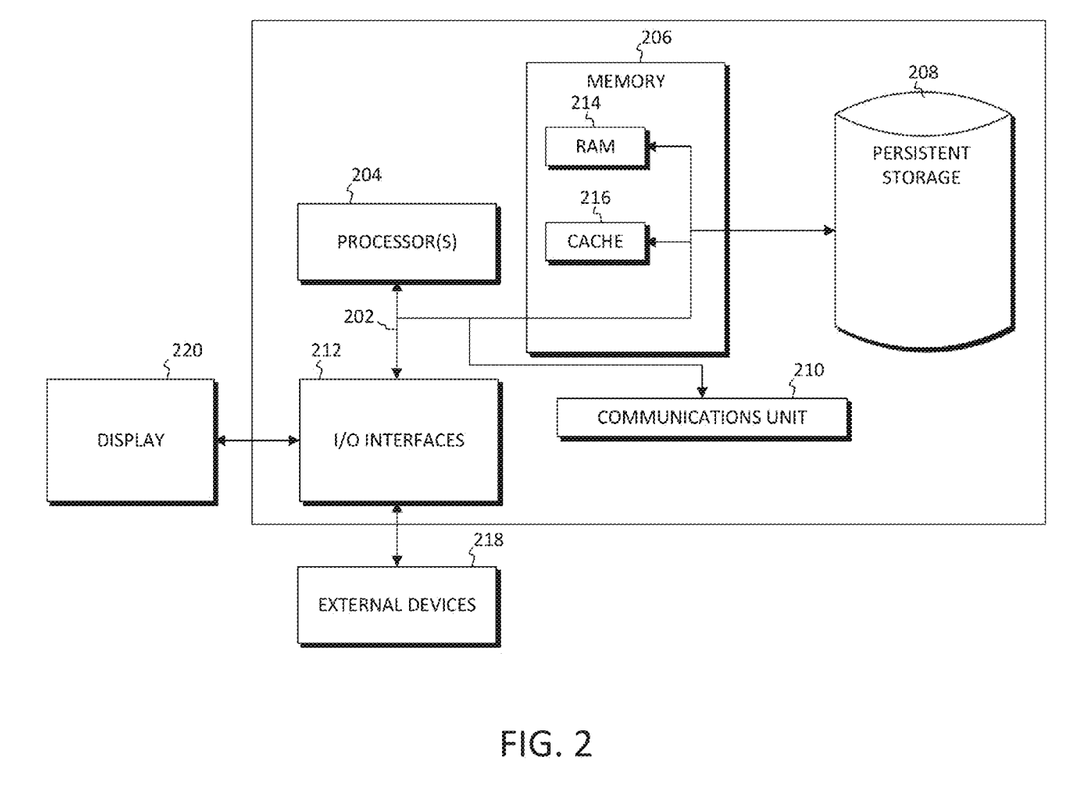
FIG. 2 depicts a block diagram of example components of a computer, in accordance with the embodiment of FIG. 1.

The computer 102 analyzes images captured by the camera 104 to detect the target object 130, predicts a future location of the target object 130, and modifies input images to match the predicted position of the target object 130 in order to generate an augmentation image. The computer 102 can be a desktop computer, a laptop computer, a tablet, a smartphone, a personal digital assistant, a server computer, or any other system capable of executing computer executable instructions. For example, the computer 102 can be a distributed computing system connected over a network (not shown) as is common in cloud computing systems. FIG. 2 depicts a block diagram of components of the computer 102. It should be appreciated that FIG. 2 provides only an illustration of one implementation and does not imply any limitations. Many modifications to the depicted environment may be made without departing from the scope of this disclosure.

With respect to FIG. 2, the computer 102 includes a communications fabric 202, which provides communications between computer processor(s) 204, a memory 206, persistent storage 208, a communications unit 210, and input/output (UO) interface(s) 212. The communications fabric 202 can be implemented with any architecture designed for passing data and/or control information between processors (such as microprocessors, communications and network processors, GPUs, etc.), system memory, peripheral devices, and any other hardware components within a system. For example, the communications fabric 202 can be implemented with one or more buses.

The memory 206 and the persistent storage 208 are computer-readable storage media. The memory 206 includes a random access memory (RAM) 214 and a cache memory 216. In general, the memory 206 can include any suitable volatile and/or non-volatile computer-readable storage media.

The persistent storage 208 includes a magnetic hard disk drive. Alternatively, or in addition to a magnetic hard disk drive, the persistent storage 208 can include a solid state hard drive, a semiconductor storage device, read-only memory (ROM), erasable programmable read-only memory (EPROM), flash memory, or any other computer-readable storage media that is capable of storing program instructions or digital information.

The media used by the persistent storage 208 can also be removable. For example, a removable hard drive can be used for the persistent storage 208. Other examples include optical and magnetic disks, thumb drives, and smart cards that are inserted into a drive for transfer onto another computer-readable storage medium that is also part of the persistent storage 208.

The communications unit 210, in these examples, provides for communications with other data processing systems or devices, such as the camera 104 and the projector 106. The communications unit 210 provides communications through the use of either or both physical and wireless communications links. Computer programs and processes can be downloaded to the persistent storage 208 through the communications unit 210.

The I/O interface(s) 212 allows for input and output of data with other devices that can be connected to the computer 102. For example, the I/O interface 212 provides a connection to the external devices 218 such as a keyboard, keypad, a touch screen, the camera 104, the projector 106, and/or some other suitable input device. The external devices 218 can also include portable computer-readable storage media such as, for example, thumb drives, portable optical or magnetic disks, and memory cards. Software and data can be stored on such portable computer-readable storage media and can be loaded onto the persistent storage 208 via the I/O interface(s) 212. The I/O interface(s) 212 are also connected to a display 620.

The display 220 provides a mechanism to display data to a user and can be, for example, an embedded display screen or touch screen.

Figure 3:
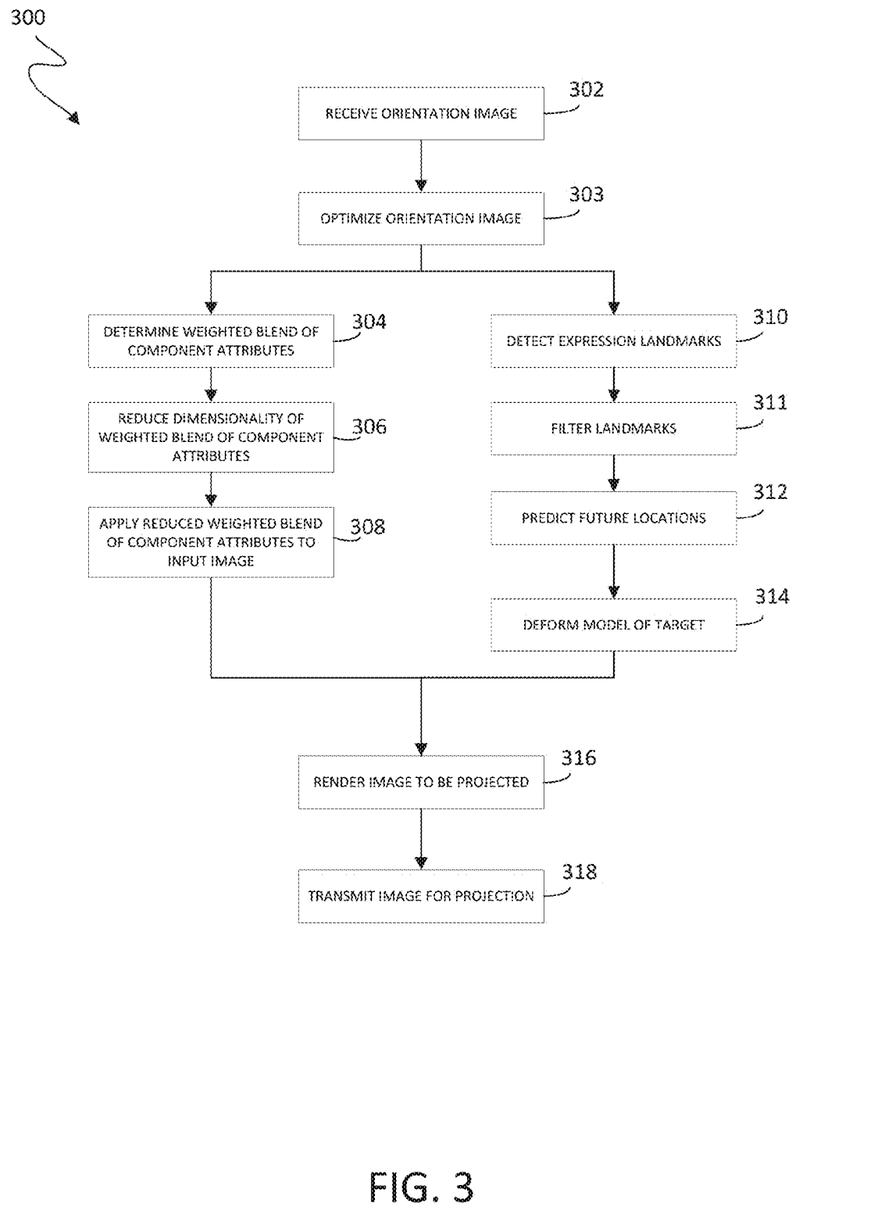
FIG. 3 depicts a flowchart for a method of augmenting a target object with projected light.
Figure 4:
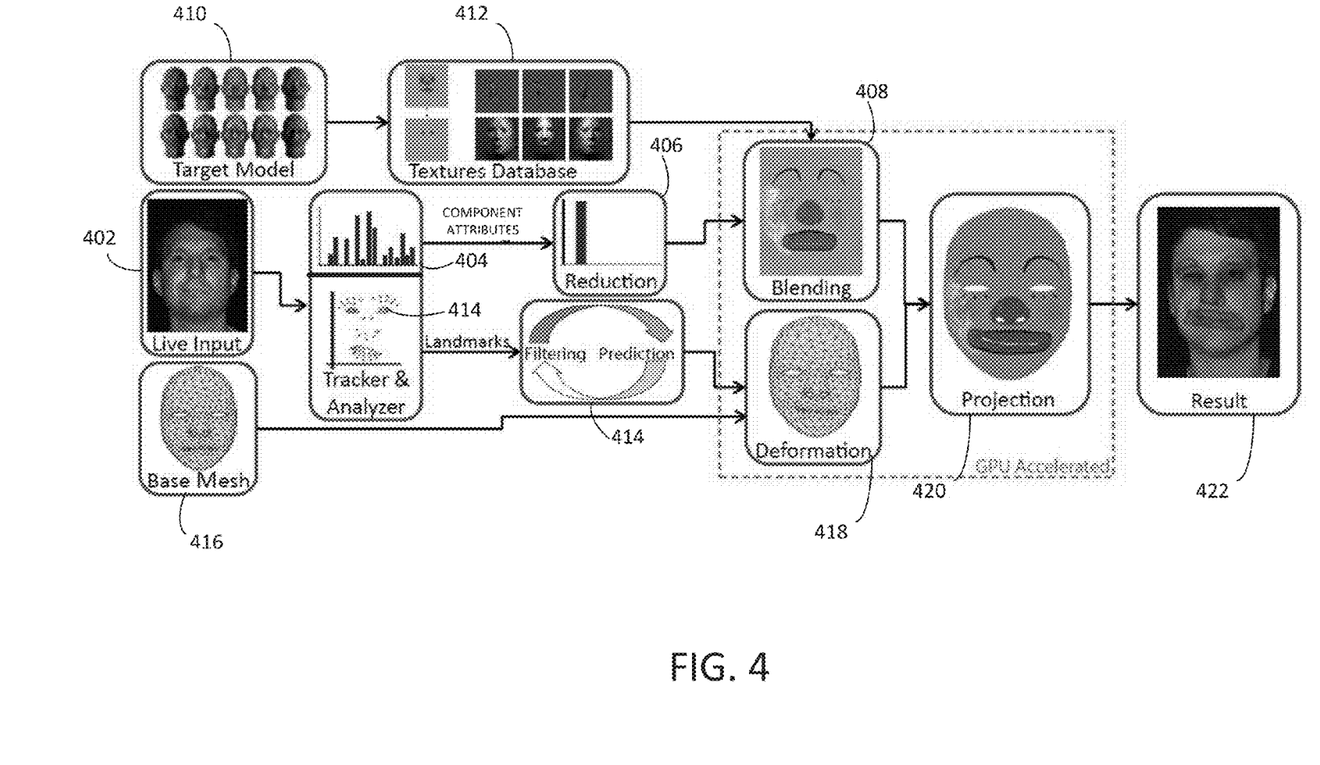
FIG. 4 depicts a data flow diagram for augmenting a target object with projected light according to the method of FIG. 3.

A method 300 for augmenting a target using the system of FIGS. 1 and 2 will now be discussed with respect to FIGS. 3 and 4. Initially, the camera 104 captures one or more orientation images of the target 130. In an example embodiment, the camera 104 captures the orientation image of the target 130, where the target 130 in a first position, such as capturing the target 130 as it moves on the stage or other area. In one example, the illumination sources 104 direct the EM radiation 110 toward the target 130. The target 130 reflects some or all of the EM radiation 110 toward the optical alignment device 112, which directs EM radiation 110 toward the filter 114 and the camera 104. The camera 104 captures the orientation image of the target 130 at the predetermined wavelength(s) and records the time at which the orientation image was captured.

In some examples, the orientation image is a greyscale image of the target 130 where the greyscale is based on the intensity of light detected by each pixel of the camera 104. The orientation image includes pixel values (e.g., for color, hue, chroma, brightness, value, luminosity, etc.) corresponding to an appearance of the target 130 in the first position. The appearance of the target 130 may depend on the particular position that the target 130 is in at the time the orientation is captured. For example, the target 130 may be in a particular position that results in the surface of the target 130 having wrinkles, shading, increased or decreased reflectivity, or other visually perceptible characteristics.

The method 300 begins with operation 302 and the computer 102 receives orientation images captured by the camera 104. The orientation images may be received as a live input 402 of orientation images from the camera 104. The orientation images can be received from the camera 104 via any communication means. For example, the orientation images may be received over a hardwire connection, such as a universal serial bus, a fiber optic cable, an Ethernet cable, or any other wired means of communication. Alternatively, the image may be received over a wireless network connecting the computer 102 to the camera 104. Operation 302 may be performed periodically to provide the computer 102 with a stream of orientation images from the camera 104.

Periodically receiving orientation images at allows the system 100 to update the augmented image in real-time as the target 130 moves.

In optional operation 303, the computer 104 optimizes the received orientation image. Optimization can be performed using any type of optimization technique, such as filtering, noise reduction, scaling, contrast enhancement, color enhancement, etc. In one example, the computer 104 reduces noise in the received orientation image by averaging pixel values (such as hue, chroma, luminosity, etc.) over several adjacent pixels within a single captured image to smooth discontinuities resulting from noise in the pixel values. For example, for each pixel in the optimization image, the computer 104 may average pixel values for a 3 pixel×3 pixel area surrounding each pixel and replace the pixel values received from the camera 104 with the average pixel values of the surrounding 3×3 area.

After receiving the orientation image, the system 100 performs a number of operations in parallel as described below with respect to operations 304-314. The sets of parallel operations independently determine visual appearance (as represented by pixel values) of each point on the target 130 and the predicted future locations of landmarks on the target 130. In a first set of operations, 304-308, the computer 102 determines a physical appearance of points on the target 130 in the received image by analyzing pixel values in the orientation image and modifying the pixel values of an input image for projection based on the pixel values of the orientation image. A second set of operations, 310-314, determines the deformation of the target 130 in the orientation image by detecting landmark locations, predicting future locations of the landmarks, and deforming a model of the target 130 to match the predicted locations of the landmarks. In some examples, the two sets of operations can be executed in parallel by the processor(s) 204 of the computer 102 in order to expedite the processing allowing real time augmentation of the moving target.

In operation 304, the system 100 determines a weighted blend of component attributes 404 that describe the appearance of the target 130 in the orientation image. Generally, component attributes are isolated physical features, characteristics, aspects, or qualities that describe or affect the appearance on the target 130. For example, component attributes can include component facial expressions that correspond to isolated facial movements, such as eyebrow raises, smiles, lip puckering, opening a mouth, nose crinkling, etc. Each component attribute may be represented by a plurality of attribute images, which may be stored in a database or other data structure within the computer 102. The attribute images depict a range of possible visual appearances of the isolated physical features, characteristics, aspects or qualities. For example, one component attribute may be "raising eyebrows," and the plurality of corresponding attribute images may include one attribute image where the eyebrows are not raised at all, one image where the eyebrows are completely raised, and a number of images depicting the eyebrows as raised to varying degrees between not raised at all and completely raised. Each image in the plurality of attribute images may correspond to a particular weighted value. The weighted values are indicative of the extent to which a particular component attribute contributes to the physical appearance of the target 130, as it appears in the received image. For example, a weight value can be applied to a mathematical variable corresponding to shading resulting from a raised eyebrow. In this example, a relatively high weighted value can indicate the presence of a relatively large amount of shading appears in the received image as a result of a fully raised eyebrow. Similarly, a low weighted value indicates that a relatively low level of shading appears in the orientation image as a result of a partially raised eyebrow. In one example, the component attributes are a set of component attributes defined by a standard setting organization, such as the MPEG-4 facial action coding system as defined by the Moving Picture Experts Group standards setting organization.

In another example, the component attributes are keyed to specific targets 130. For example, prior to a performance, attribute images of the target 130 may be captured to identify the effects of various movements and deformations on the appearance (i.e., pixel values) of the target 130. A performer may make several different facial movements or expressions, such as eyebrow raises, smiles, lip puckering, opening a mouth, nose crinkling, etc., and attribute images may be captured by a camera of the performer imitating each of the several facial movements. In some examples, the system 100 may use a combination of standardized component attributes and performer-specific component attributes to determine the weighted blend of component attributes. In other embodiments, the system may use only one type of component attributes, such as performer specific attributes.

Figure 6:
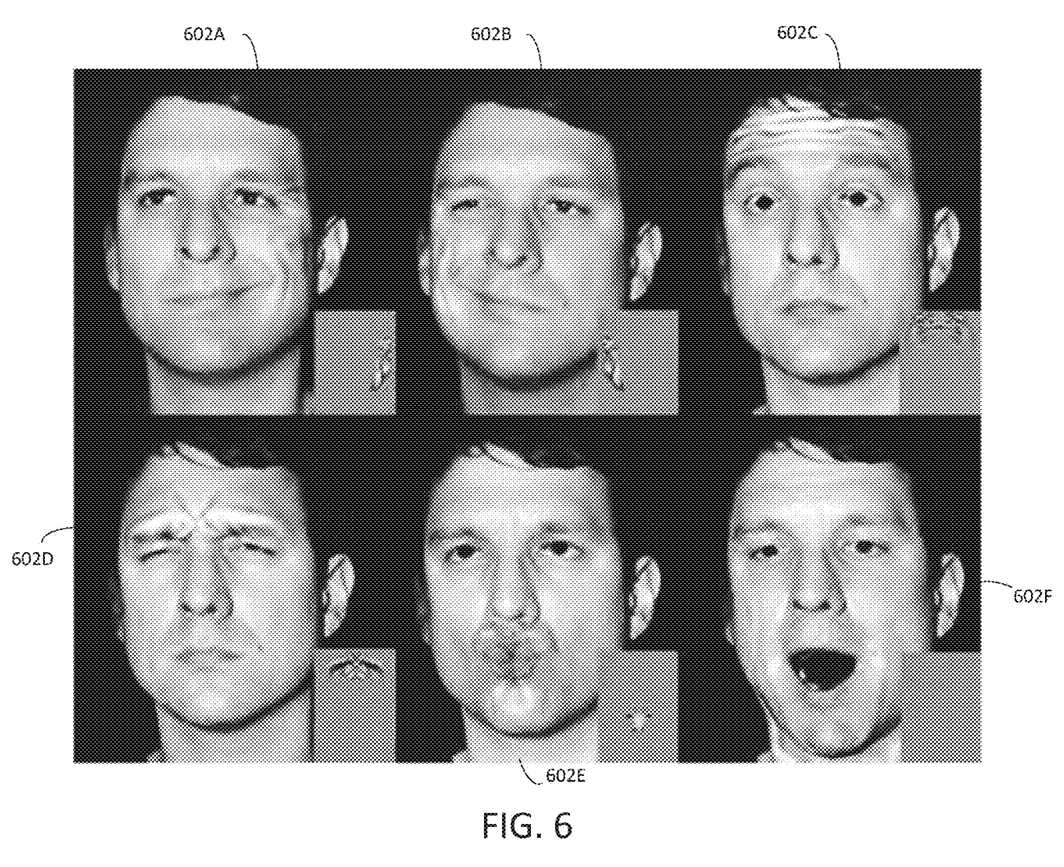
FIG. 6 depicts example performer images and component expressions for use with the method of FIG. 3.

Example performer specific component attribute images are shown in FIG. 6. The performer images 602A-E illustrate a target 130 having different facial expressions corresponding to six example component attributes, as well as inlaid images showing a corresponding attribute image. The performer image 602A shows a left lip raise. The performer image 602B shows a right lip raise. The performer image 602C shows in eyebrow raise. The performer image 602D shows an eyebrow furrow. The performer image 602E shows a lip pucker. The performer image 602F shows an open mouth position. The performer images shown in FIG. 6 are exemplary only and many other attributes may be used or captured. Often the captured attributes may be based on the desired augmentation and the movement of the target 130 to allow a more tailored database of possible attributes.

To determine the weighted blend of component attributes, the system 100 identifies variations in the pixel values and determines the weight value corresponding to the attribute image that most closely approximates the appearance of the orientation image. For example, the system 100 detects variations in the appearance of the target 130 by measuring variations in pixel values in the orientation image of the target 130 and comparing the variations to the pixel values of the plurality of attribute images. Once a matching attribute image is identified, the computer 102 may determine the weighted value associated with that attribute image. The weighted values are the applied to mathematical variables representing the component attributes in a linear combination. When the weighted mathematical variables are combined in a linear combination, the complete appearance of the target 130 is fully described.

As a specific example, where the target 130 is a face, the component attributes can correspond to component expressions. In this approach, a set of $n_b+1$ component expressions $B_0, \ldots, B_{n_b}$ are used as a linear basis to span the expression space. A desired expression can be represented as a normalized weighted sum $\Sigma_{i=0}^{n_b} w_i \cdot B_i$, where $w_i$ represents the weighted values. Equivalently, the same basis can be considered as a neutral expression (also known as the rest pose) $B_0$ and a set of offsets $\hat{B}_i = B_i - B_0$, $i=1, \ldots, n_b$. In this case, an expression is described as $B = B_0 + \Sigma_{i=0}^{n_b} w_i \cdot \hat{B}_i$.

In operation 306, the computer 102 reduces the dimensionality of the weighted blend of component attributes. This enhances processing speed for the system 100 to further reduce lag between capturing the orientation images and projecting the augmentation image. In operation 306, the total number of component attributes used to describe the appearance of the target 130 is reduced. The computer 102 determines the minimum component attributes necessary to fully describe the visual appearance of the target 130 as it appears in the orientation image. Component attributes having little or no effect on the appearance of the object or whose effects are cumulative to other component attributes are removed from the linear basis and the resulting linear combination of component expressions. In some examples, the particular component attributes that contribute to the appearance of the object can be experimentally determined prior to runtime by capturing test images of the target 130 moving through its full range of motion and analyzing the test images to identify each independent component attribute that results in a perceptible change in the appearance of the object. In another example embodiment, the computer 102 analyzes a series of orientation images of the target 130 in a similar manner to isolate the independent component attributes. Determining which component attributes have the greatest effect on the appearance of the target 130 is largely dependent on the nature of the target 130. That is, based on the possible range of motion of the target 130, certain component attributes may more heavily affect the appearance of the target than other component attributes.

For example, in embodiments where the target 130 is a human face, component attributes corresponding to facial expressions can be divisible into two main groups. The first group covers the surrounding areas of the eyebrows, eyes and nose. The second group includes the muscles distributed around the mouth. Wrinkle formation can be represented by the main controlling muscles of the first and second groups, and the following expressions can be considered to fully describe the appearance of the target 130: eyebrow raising and lowering, lip corner pulling (raising) and lip tightening, and a jaw dropping (open mouth) expression can also be considered. Although the reduced dimensionality of the component expressions is described as being six where the target 130 is a human face, those skilled in the art will appreciate that greater or fewer numbers of component attributes are possible without departing from the scope of this disclosure.

In operation 308, the system 100 applies the reduced weighted blend of component attributes 406 to an input image for projection 408. The computer 102 modifies the pixel values of the input image for projection 408 to match the pixel values of the particular attribute images corresponding to the weighted values included in the reduced weighted blend of component attributes. The input image for projection 408 includes pixel values describing a desired visual appearance of the augmented target 130. The pixel values may include, for example, color, hue, chroma, saturation, value, shading, etc. Collectively, the pixel values can be included in a texture file that provides a desired appearance of the augmented target 130 without accounting for any deformation in the target 130. For example, the input image for projection 408 can include pixel values that, when projected onto the target 130 by the projector 106, gives the illusion that the performer is wearing make-up, has facial hair, or other visual attributes, etc. The input image for projection 408 can be generated before a performance and stored in a texture database 412 in the computer 102 as image files (e.g., .TIFF, .JPG, .BMP, etc.) for access at runtime. Input images for projection 408 may be generated based on a target model 410. The target model 410 is a digital model of the target 130. For example, if the target 130 is a face, then the target model 410 is a digital model of a face. Thus a graphics designer generating input images for projection 408 can design the textures using a graphics editing program with reference to a model of the target 130.

Operations 310-314 generally act to determine the location of physical points on the target 130 and to deform a model of the target 130 to accurately reflect the position of physical landmarks on the target 130 at the time of projection. Whereas operations 304-308 produce a modified input image for projection that reflects the visual characteristics and appearance of the target 130 on a pixel by pixel basis, operations 310-314 predict the future locations of particular points of interest (landmarks) on the target 130 and deform a model of the target 130 to match the predicted locations. The deformed model is then combined with the modified input image to be projected in order to generate a final augmentation image that is transmitted to the projector 106 for projection onto the target 130.

In operation 310, the system 100 detects the relative locations of landmarks in the orientation image corresponding to landmarks on the target 130. For example, the system 100 may implement image analysis software that analyzes an image of the target 130 to detect the locations of particular landmarks. In general, any type of image analysis software may be used to detect the locations of the landmarks. In examples where the target 130 is a face, facial tracking software may be used to determine the locations of the landmarks on the face. As shown in FIG. 4, the live input of images 402 is provided to the image analysis software to detect the locations of landmarks 414. The image analysis software may automatically detect distinct facial features, such as eyelids, distance between the eyes, nose bridge and tips, lips, etc. The image analysis software can identify the landmark locations 414, for example, by detecting changes in the color, saturation, hue, shade, etc. of the captured image. In one example, the image analysis software compares pixel values (hue, brightness, color, etc.) of adjacent pixels to identify boundaries between pixels. A boundary can appear, for example, as a change in color in the captured image. Different patterns of variations in pixel values may correspond to different landmarks. For example, a generally circular pattern of pixels having black or nearly black color surrounded by pixels having a white color may correspond to eyes. Similar processes can be used to detect landmarks with respect to noses, eyebrows, mouths etc., based on the particular patterns of pixel values that are characteristic of the landmarks.

In operation 311, the system 100 filters the landmarks. During the capturing and analyzing of the orientation image, noise may be introduced into the pixel values of the image being processed. The locations of the landmarks 414 may be filtered to reduce the noise by, for example, averaging landmark locations 414 over several images received over time. Alternatively, noise can be reduced by averaging pixel values over several adjacent pixels within a single captured image and determining the locations of the landmarks 414 based on the averaged pixel values in accordance with operation 410. Other filtering techniques may also be used. However, an increase in the amount of filtering may result in increased latency, which can adversely affect performance. Thus, the particular type and amount of filtering may be adjusted depending on the particular implementation.

In operation 312, the system 100 predicts the future locations of the landmarks. Latency arises between the time the orientation image was captured by the camera 104 and the time the projector 106 projects the augmented image onto the target 130 as a result of image processing operations. As a result of the latency, the target 130 may move between the time that orientation image was captured and the time that the augmentation image is projected onto the target 130. Without predicting future locations of the landmarks, the augmentation image would not account for this movement. Thus, the augmentation image would appear misaligned to an audience, especially in instances where the target has moved significantly. Operation 312 performs filtering operations to reduce the noise and prediction operations to account for the latency.

To predict the future locations of the landmarks, the computer 102 estimates the future state of a signal based on a constant amount of computations. In one example, the system 100 uses a Kalman filter for predicting future locations of landmarks. To determine the future locations, a position predictor, which can be included in the Kalman filter, estimates the position, velocity, and acceleration of each landmark. The velocity and acceleration of the landmarks may be estimated over time by analyzing changes in the positions over multiple orientation images of the live input of images 402. For example, the distance that a landmark moved over a known time period between location detections, which can be derived from the timestamps provided by the camera 104 when capturing the orientation images, can be used to estimate the landmark's velocity and acceleration during that time period. Based on the estimated position, velocity, and accelerations for the landmarks, as well as the time elapsed since the receive image was captured, future locations can be predicted at any given point in time. Once the position, velocity, and acceleration are estimated, future locations can be predicted by extrapolating the model to future time periods.

In one example, a minimum mean-square error (MMSE) estimator and predictor in the form of a Kalman filter on each coordinate of each landmark is used to account for the noise and latency. A Kalman filter, also known as a linear quadratic estimation, is an algorithm that uses a series of measurements observed over time, containing statistical noise and other inaccuracies, and produces estimates of unknown variables (e.g., position) using Bayesian inference and estimating a joint probability distribution over the variables for each time frame. The Kalman filter disclosed herein estimates a third-order dynamics model. A state vector $X \in \mathbb{R}^3$ is the physical configuration of the point: position, velocity, and acceleration (x, v, a). The process transition A, the process noise covariance Q, and the measurement noise covariance R are defined as follows:

$$A = \begin{pmatrix} 1 & \Delta t & \Delta t^2 \\ 0 & 1 & \Delta t \\ 0 & 0 & \alpha \end{pmatrix};$$

$$Q = \begin{pmatrix} 0 & 0 & 0 \\ 0 & 0 & 0 \\ 0 & 0 & q_m^2 \end{pmatrix};$$

$$R = (\sigma_X^2)$$

where $\Delta t$ is a time step, $$\alpha = e^{\frac{-\Delta t}{\tau_m}},$$

$$q_m = \sigma_a (1 - \alpha)^2,$$

and $\tau_m$, $\sigma_a$, and $\sigma_X$ are parameters. Example values for the parameters include $\tau_m = 0.1$, $\sigma_a = 500$, and $\sigma_X = 0.5$, however, other values of the parameters can be used as well. In operation 312, the process states can be updated for each captured image, adaptively changing $\Delta t$ to be the difference between the time the most recent image was captured and the time the previous image was captured. Before rendering each frame, the current timestamp (at the time of rendering) can be used to predict the process state at the time of projection. Those skilled in the art will appreciate that updating $\Delta t$ effectively means changing only two matrices (A and Q), that are common to all filters. Therefore, the required processing time is reduced. Except for a rapid change in motion direction, the prediction can bring the lag down to less than 3 ms for most of the performance. Once the Kalman filter has been applied to each of the landmarks in operation 312, the system 100 generates a predicted location for each of the landmark points at the projection time. Thus, when the projector 106 projects the augmented image onto the target 130, the landmarks of the projected image will align with the landmarks on the target 130.

In operation 314, the system 100 deforms a model of the target 130 to match locations of the target landmarks to the predicted locations of the landmarks generated in operation 312. In one example, the model is a base mesh 416 is a deformable 2D rendering of the target 130, such as a deformable wireframe representation of the target 130. The base mesh 416 may be previously generated and stored in the memory of the computer 102 using 2D modeling techniques. The base mesh 416 includes moveable landmarks that correspond to detectable landmarks on the target 130. The base mesh 416 can be created before runtime to approximate the locations of various landmarks on the target object 130. For example, where the target 130 is a face, landmarks (e.g., edges of lips, eyes, eyebrows, nose, etc.) can be detected at various locations on the face, and corresponding landmarks are then defined on the base mesh 416 that can be adjusted to match the movement of landmarks on the target 130. To deform the base mesh 416, the relative locations of the landmarks in the base mesh 416 are moved by the computer 102 to align with the predicted positions of the landmarks generated in operation 312. By matching the predicted locations of the landmarks with the landmarks in the base mesh 416 to generate the deformed mesh 418, the system 100 increases the likelihood that the locations of the landmarks in the final projected image match the locations of the landmarks on the target 130 at the time of projection.

In one example of deformation according to operation 314, the detected landmarks can be used as constraints in a Laplacian deformation. In such a deformation, given the base mesh M=(K,V) of the neutral pose, where K describes the connectivity and V=$v_i$; ...; $v_n$ describes vertex positions in $\mathbb{R}^3$. L is the Laplacian matrix such that:

$$L_{ij} = \begin{cases} 1, & i = j \\ -w_{i,j}, & (i, j) \in K \\ 0, & \text{Elsewhere} \end{cases}$$

where $w_{ij}$ are cotangent weights. To register the landmarks P=$p_1$ ... $p_m$, M is projected onto the base mesh 126 using barycentric coordinates. Each landmark can be expressed as $p_i = \Sigma_{j=1}^3 u_{ij} \cdot v_j$ where $v_1$; ...; $v_3$ form the triangle in which $p_i$ resides. Denoting the Laplacian coordinates of the neutral pose $\delta = L \cdot V$. At run-time, the system $$\tilde{L} = \begin{pmatrix} L \\ \omega L_p \end{pmatrix} = \begin{pmatrix} \delta \\ \omega P \end{pmatrix}$$

can be solved in a least squares manner, where $L_p$ is the matrix that corresponds to the barycentric coordinates representing P in M and ω is a predefined weight (e.g., ω=100). It may be noted that this method is not scale invariant. Therefore, the landmarks positions can be scaled according to a bounding box of the detected face prior to solving the equation.

Once the base mesh 416 is deformed to match the predicted positions of the landmarks, the augmentation image is rendered by the system 100, in operation 316. As shown in FIG. 4, the system 100 overlays the blended texture 408 as modified in operations 304-308 to the deformed mesh 418 generated by operations 310-314 to produce the augmentation image 420. The deformed mesh 418 includes texture coordinates at each vertex that correspond to particular pixels in the blended texture 408. The texture coordinates may be stored as metadata associated with the deformed mesh 418. When the system overlays the blended texture 408 onto the deformed mesh 418, the vertices of the deformed mesh 418 are matched to the corresponding pixels in the blended texture 408 to ensure that the pixels of the blended texture 408 are rendered at the correct locations on the deformed mesh 418. In operation 318, the system 100 transmits the augmentation image to the projector 106 for projection onto the target 130 to generate a resulting augmented appearance 422.

Figure 5A:
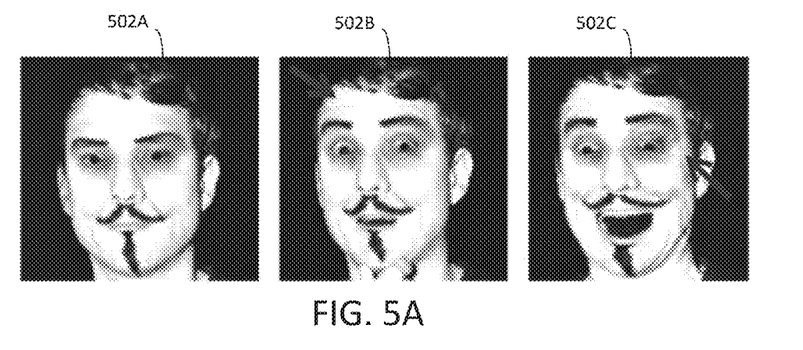
FIG. 5A depicts examples of expression-based augmentation using the method and data flow of FIGS. 3 and 4, respectively.
Figure 5B:
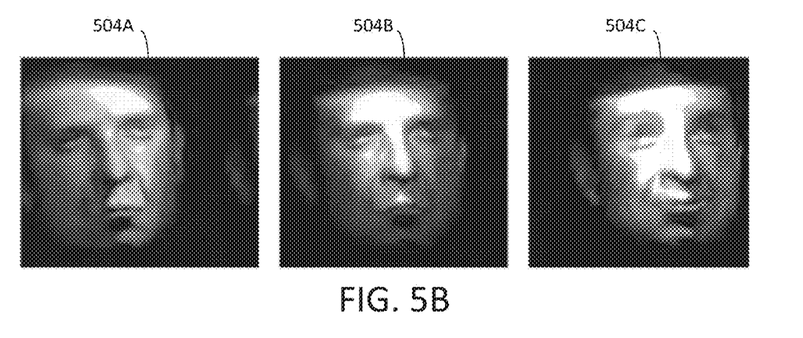
FIG. 5B depicts examples of position based illumination using the system of FIG. 1.
Figure 5C:
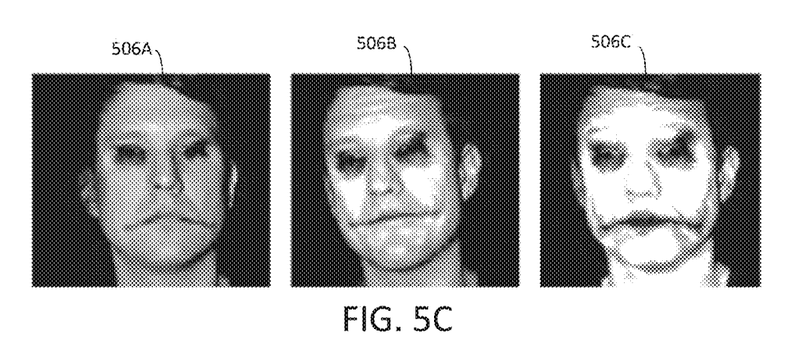
FIG. 5C depicts examples of temporal evolution of augmentation using the system of FIG. 1.

The augmentation image generated according to the methods disclosed herein can be used to generate augmented appearances 422 with a variety of visual effects. The augmentation may be used to generate expression based effects, position based illumination effects, and temporal evolution effects, and so on. FIGS. 5A-5C illustrate examples of effects that can be produced according to the systems and methods disclosed herein.

FIG. 5A depicts augmented performance images showing examples of expression-based augmentation. For example, system 100 generates an augmentation image to be projected such that the expressions of a performer are accentuated during the performance. As shown in augmented performance image 502A, the performer has a neutral expression, which is matched by neutral illumination by the augmentation image that does not accentuate any of the performer's features. In the augmented performance augmented performance image 502B, the performer has a surprised expression. As described above with respect to FIGS. 3 and 4, to achieve this result, the system detects the wrinkles on the performer's forehead from an orientation image of the performer and determines a weighted blend of component attributes to describe the appearance of the performer. A texture is modified to reflect the appearance of the performer, in other words, the texture is modified to accentuate the wrinkles on the performer. Landmarks are detected from the orientation image and a model of the performer is deformed to match predicted future locations of the landmarks. The modified input image for projection is then overlaid the deformed mesh and the result is projected onto the performer's face. Thus, the wrinkles in the forehead of the performer can be emphasized by the augmentation image as the performer raises his eyebrows. In the augmented performance image 502C, the performer has a frightened expression. The augmentation image can accentuate lines around the performer's eyes as they appear during the expressive action of the performer in a similar manner as described above with respect to augmented performance image 502B.

FIG. 5B depicts augmented performance images depicting examples of position based illumination. Performers often move to different locations on a stage. As the performer moves, the performer can be selectively illuminated by the augmented image. Because the pixels of the projector 106 can be calibrated to the pixels of the camera 104, the particular pixels of the projector that must be illuminated to produce the desired lighting effect can be derived from the orientation image captured by the camera 104. For example, augmented performance images 504A-C illustrate a performer progressing from the left hand side of an orientation image to the right hand side of an orientation image captured at a later time. In the augmented performance image 504A, the left side of the performer's face is illuminated. In the augmented performance image 504B, the center of the performer's face is illuminated. In the augmented performance image 504C, the right side of the performer's face is illuminated. As the performer moves across the field of view of the camera, the system detects the locations of landmarks on the performers face. The locations of the landmarks can undergo position prediction to predict future locations of the landmarks in accordance with operation 312, described above. Based on the predicted locations of the landmarks, the augmentation image can be adjusted to ensure that the desired features of the performer are illuminated. By adjusting the augmentation of the performer based on the location of the performer, lighting effects that are otherwise difficult to produce during a live performance can be generated in real-time.

FIG. 5C depicts augmented performance images depicting examples of temporal evolution of real-time augmentation. In various performances, a performer's appearance can be changed during the course of the performance. For example, a character can age during the course of a production, or a character's physical features can deteriorate to personify emotional or mental instability. The augmented performance image 506A depicts a performer with relatively smooth features. At a later time, the augmented performance image 506B shows that the performer's face appears to be more lined, and the dark circles projected under the performer's eyes have enlarged. In the augmented performance image 506C, the augmentation image makes the performer's face appear heavily lined relative to the earlier images. By allowing for temporal evolution of the augmentation image, particular characteristics that would traditionally require heavy makeup can be simulated with projected light, thus reducing the amount of manual labor required to produce the performance.

The programs, applications, and methods described herein are identified based upon the application for which they are implemented. However, it should be appreciated that any particular nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of augmenting a target object with projected light comprising:
   determining, by a processor, a blend of component attributes to define visual characteristics of the target object;
   modifying, by the processor, an input image based, at least in part, on an image of the target object, wherein the modified input image defines an augmented visual characteristic of the target object;
   determining, by the processor, a present location of one or more landmarks on the target object based, at least in part, on the image of the target object;
   predicting a future location of the one or more landmarks;
   deforming, by the processor, a model of the target object based on the future location of the one or more landmarks;
   generating, by the processor, an augmentation image based on the deformed model and the modified input image; and
   transmitting for projection, by the processor, the augmentation image.

2. The method of claim 1, wherein modifying the input image comprises:
   adjusting a visual characteristic of one or more points of the input image based on the blend of component attributes.

3. The method of claim 2, further comprising:
   determining, by the processor, a reduced set of component attributes, wherein visual characteristics of the one or more points of the input image are adjusted based on the reduced set of component attributes.

4. The method of claim 3, wherein determining the future location of the one or more landmarks comprises:
   determining an estimated position, velocity, and acceleration for each landmark; and
   computing a future location at a future time based on the estimated position, velocity, and acceleration.

5. The method of claim 4, wherein generating the augmentation image comprises:
   applying, by the processor, the modified input image to the deformed model of the face.

6. The method of claim 1, wherein modifying the input image and determining the location of one or more landmarks are performed independently.

7. The method of claim 1, wherein the model of the target object is a two-dimensional rendering.

8. A visual augmentation system comprising:
   a camera;
   a projector; and
   a processor coupled to the camera and the projector, the processor configured to:
      receive, from the camera, an image of a target object having a visual appearance;
      determine a weighted blend of component attributes to approximate the appearance target object based on the received image;
      modify a texture based on the weighted blend of component attributes;
      detect a location of at least one landmark in the image of the target object;
      predict a future location of the at least one landmark;
      generate a deformed model of the target object based, at least in part, on the future location of the at least one landmark;
      apply the texture to the deformed model to generate a projectable image; and
      transmit for projection by the projector, the projectable image.

9. The visual augmentation system of claim 8, further comprising:
   a filter positioned in an optical path between the target object and the camera.

10. The visual augmentation system of claim 9, wherein the camera comprises an infrared camera configured to detect infrared light reflected from or emitted by the target object.

11. The visual augmentation system of claim 10, further comprising:
    a plurality of illumination sources to illuminate the target object with light detectable by the camera.

12. The visual augmentation system of claim 9, wherein the plurality of illumination sources emit light having a first wavelength, and the infrared filter blocks light having wavelengths other than the first wavelength.

13. The visual augmentation system of claim 8, wherein the processor is further configured to predict future locations of the landmarks using a prediction filter.

14. The visual augmentation system of claim 8, wherein a number of component attributes in the weighted blend of component attributes is reduced to second number of component attributes.

15. The visual augmentation system of claim 8, wherein the projector and the camera are optically and/or computationally registered.

16. The visual augmentation system of claim 15 further comprising:
    an optical alignment component positioned between the projector and the target object and oriented to direct a portion of infrared light reflected from the target object toward the camera.

17. A method of augmenting a face with projected light comprising:
    receiving, by a processor, an image of a face, wherein the image is of infrared light reflected from the face;
    analyzing the image of the face, by the processor, to independently detect current locations of landmarks and a facial expression;
    altering, by the processor, an appearance of an input image based, on the facial expression;
    predicting, by the processor, future locations of the landmarks based on the current locations of the landmarks;
    deforming, by the processor, a digital representation of the face based on the locations of the landmarks;
    applying, by the processor, the altered input image to the deformed digital representation of the face to generate an augmentation image; and
    transmitting, by the processor, the augmentation image for display.

18. The method of claim 17, wherein a Kalman filter predicts the future locations of the landmarks.

19. The method of claim 17, wherein detecting the facial expression comprises:

determining a first weighted blend of component expressions describing the facial expression; and determining a second weighted blend of component expressions, wherein the second weighted blend of component expressions is based on fewer component expressions than the first weighted blend of component expressions.

20. The method of claim 19, wherein the second weighted blend of component expressions describes visual characteristics of the face.

21. The method of claim 19, wherein the second weighted blend of component expressions is based on a range of facial expressions associated with a particular performer.

22. The method of claim 17, wherein the processor comprises at least one of a central processing unit and a graphics processing unit.

\* \* \* \* \*